No. 685,818. Patented Nov. 5, 1901.
R. M. CLOSE.
PIPE COUPLING.
(Application filed Nov. 28, 1900.)
(No Model.)
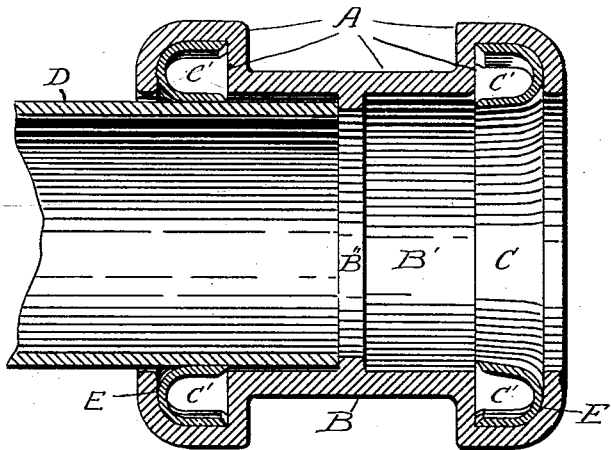
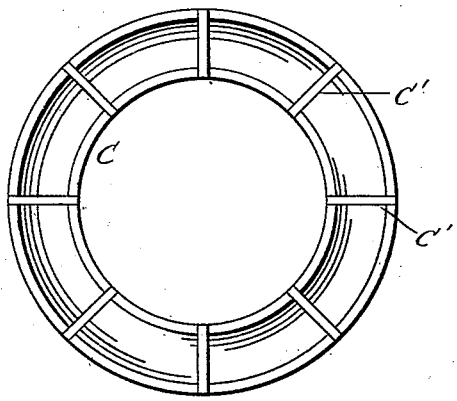
Witnesses
Harry A. Brooks
Mattie M. Ginnis
Inventor
Rufus M. Close
By
Hazard & Harpham
Attorneys

UNITED STATES PATENT OFFICE.

RUFUS M. CLOSE, OF LOS ANGELES, CALIFORNIA.

PIPE-COUPLING.

SPECIFICATION forming part of Letters Patent No. 685,818, dated November 5, 1901.

Application filed November 28, 1900. Serial No. 38,054. (No model.)

*To all whom it may concern:*

Be it known that I, RUFUS M. CLOSE, a citizen of the United States, residing at Los Angeles, in the county of Los Angeles, State of California, have invented new and useful Improvements in Pipe-Couplings, of which the following is a specification.

My invention consists in a packing-ring and sleeve for use in coupling pipe; and the object thereof is to provide a simple coupling by which two sections of pipe can be quickly coupled together and at the same time render the joint therebetween liquid or gas tight. I accomplish this object by the coupling-joint described herein and illustrated in the accompanying drawings, in which—

Figure 1 is a longitudinal central section of my pipe-coupling and a piece of pipe in one end thereof. Fig. 2 is a view of my packing-ring.

Heretofore in laying pipe-lines in which gases or liquids are conveyed under pressure the different sections thereof have usually been joined together by screw-threaded joints or by packed and soldered joints. In the case of packed and soldered joints, which is the usual way of laying gas and water mains in cities, much time is required in soldering the joints, and in order to remove any section thereof it is usually necessary to break the pipe. With my improved pipe-coupling there is no loss of time in making the joints tight and the sections of the line can be taken apart easily without detriment thereto or to the coupling-joint.

In the drawings, A represents the coupling-joint by means of which the ends of two sections of pipe are united together. It is composed of the coupling-sleeve B and the packing-ring C. The coupling-sleeve B is provided at each end with sockets B' for the reception of the ends of the pipe D. This sleeve has an internal central rib B'', against which the ends of the pipe abut when in place in the sleeve. Each end of the sleeve is provided with an annular recess E of suitable shape to receive the packing-ring. The packing-ring is made of a yielding material and of a shape to fit into the recess in the end of the sleeve, with the edges thereof adapted to tightly contact one edge with the extreme outer edge of the recess and the other edge with the pipe when placed in the socket and having an opening between the sides. In order that the ring shall fit very tight, I have provided cross-ribs C' to hold the edges of the base expanded.

When sections of pipe are to be coupled together, a packing-ring is placed in each of the recesses in the ends of the sleeve. It will be observed that the inner edge of the base of the packing-ring projects slightly into the space to be occupied by the pipe, and when the end of the pipe is pushed into the socket, as shown in Fig. 1, that the packing-ring is expanded and contacts with it almost one-half its length, and that there is a U-shaped annular space between the inner sides of the packing-ring. When pressure is applied to the material passing through the pipe, a portion thereof is forced into the annular space within the packing-ring and causes the same to more tightly contact with the sleeve and the pipe.

I have illustrated in the drawings the shape of the recess and packing-ring that I have found in practice to effect good results, the recess in cross-section being the one-half of a U and the packing-ring in cross-section a full U with expanded top. It is obvious, however, that the recess and packing-ring may be of other shape, the essential features of my invention being a sleeve having a socket at each end for the reception of the ends of the pipe and having an internal annular recess for the reception of a packing-ring, which ring is substantially U-shaped in cross-section, with reinforcing edge expanding cross-ribs, adapted to form a tight joint between the sleeve and the pipe and in which the greater the pressure the tighter the packing-ring is forced against the sleeve and pipe.

Having described my invention, what I claim as new, and desire to secure by Letters Patent, is—

1. A pipe-coupling, comprising a sleeve having a central internally-projecting rib and sockets in each end thereof, and an internal annular recess in each socket; and a yielding packing-ring U-shaped in cross-section and having reinforcing expanding cross-ribs in said recess adapted to make a tight contact between the pipe in the socket and the sleeve.

2. In a pipe-coupling for connecting lengths of pipe, a circular packing-ring for insertion in an annular recess in the ends of the coupling, the said packing-ring being of pliable material; U-shaped in cross-section being reinforced by cross-ribs C'.

In witness that I claim the foregoing I have hereunto subscribed my name this 22d day of November, 1900.

RUFUS M. CLOSE.

Witnesses:
G. E. HARPHAM,
MATTIE MCGINNIS.